United States Patent [19]
Shahar et al.

[11] Patent Number: 5,922,055
[45] Date of Patent: Jul. 13, 1999

[54] METHOD FOR DETERMINING A TYPE OF A SERIAL EEPROM AND PLUG AND PLAY CONTROLLER

[75] Inventors: Boaz Shahar, Givataim; Udi Barel, Rishon Le Zion; Alon Ratinsky, Hadera, all of Israel

[73] Assignee: Motorola, Inc., Schaumburg, Ill.

[21] Appl. No.: 08/805,544

[22] Filed: Feb. 25, 1997

[51] Int. Cl.⁶ .................................................. G06F 12/02
[52] U.S. Cl. .................................................. 710/16
[58] Field of Search ........................... 364/900; 365/218, 365/185.33; 395/836 OR; 710/16

[56] References Cited

U.S. PATENT DOCUMENTS

| | | | |
|---|---|---|---|
| 4,592,011 | 5/1986 | Mantellina et al. | 364/900 |
| 5,053,990 | 10/1991 | Kreifels et al. | 364/900 |
| 5,295,108 | 3/1994 | Higa | 365/218 |
| 5,650,967 | 7/1997 | Seibert | 365/185.33 |

Primary Examiner—Hassan Kizou
Assistant Examiner—Omar A. Omar
Attorney, Agent, or Firm—Robert Handy; Keith E. Witek

[57] ABSTRACT

In a Plug and Play environment different kinds of EEPROMs can be used having different access protocols without having to add an additional pin to the EEPROM to indicate its type. The first type of EEPROM has a code which indicates the first type stored on a predetermined address whereas the second type of EEPROM having a different read protocol has another code which indicates the second type stored on a consecutive address. When the Plug and Play controller accesses the EEPROM for a read either the code 1 or code 2 is outputted whereby the appropriate read protocol is identified.

20 Claims, 5 Drawing Sheets

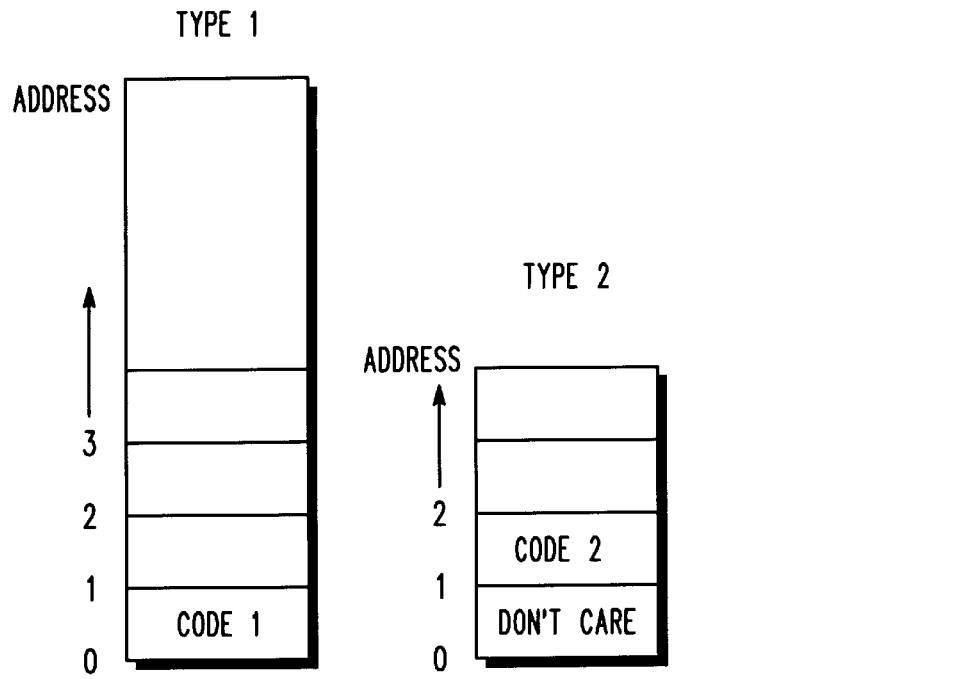
*FIG.5*
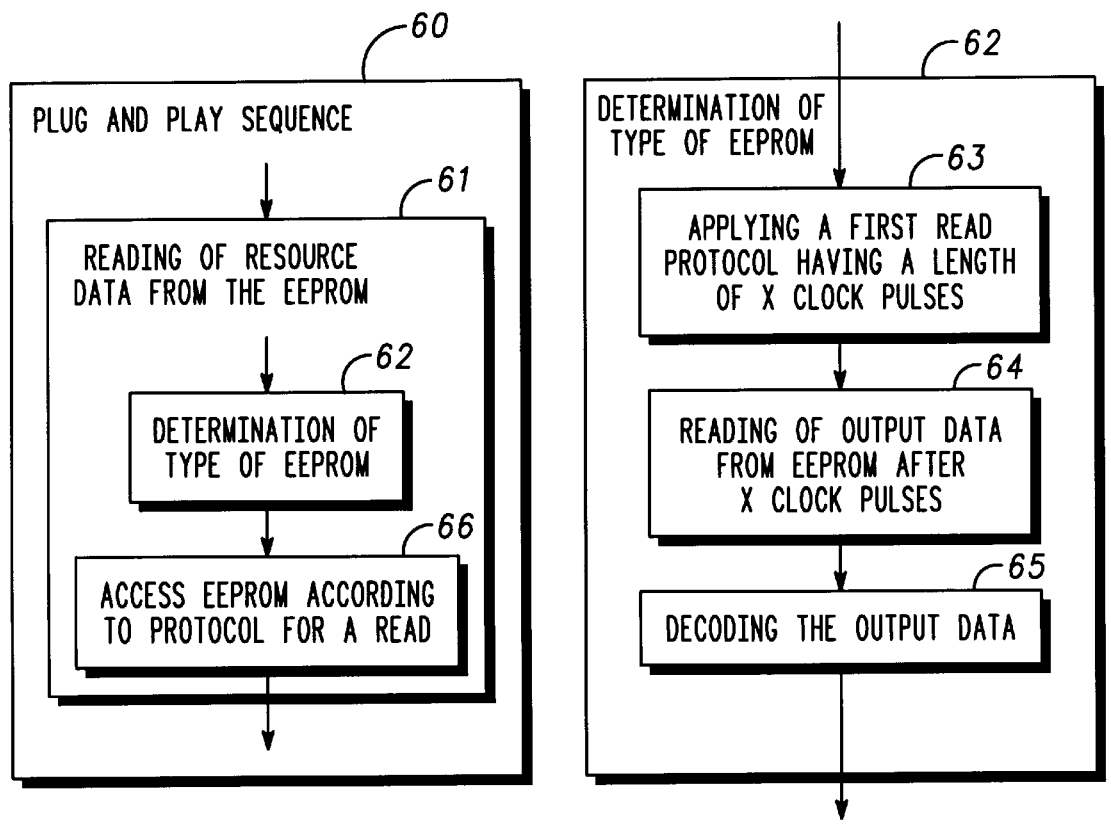
*FIG.6*  *FIG.7*

METHOD FOR DETERMINING A TYPE OF A SERIAL EEPROM AND PLUG AND PLAY CONTROLLER

FIELD OF THE INVENTION

The present invention relates generally to the operation of semiconductor memories, and more particularly to a serial electrically erasable programmable read only memory (EEPROM), primarily for use in applications requiring storage and serial transmission of resource information such as configuration and/or initialization information.

BACKGROUND OF THE INVENTION

A serial EEPROM is a serial access programmable non-volatile memory device. Such memory devices are widely used throughout the computer industry for a large variety of different applications. Typically EEPROMs are used in electronic devices for storage of essential information which has to be maintained during power of and/or which has to be available when the electronic system is initialized. One difficulty which is encountered in the usage of such EEPROMs is that there are different types of EEPROMs which have different read protocols. In the prior art this requires the storage of a priori information about the read protocol to be used to access configuration and/or initialization information or a dedicated hardware design to implement the read protocol of the particular EEPROM used in the system.

This disadvantage is accepted in the prior art in view of the main advantage of a serial EEPROM which is its low cost and small chip size as compared to parallel non-volatile devices such as flash memory devices. The main reason for its low cost is its small pin count: as access is done in a serial manner no address and data busses are needed.

Therefore one particularly important field of application of EEPROMs is for "Plug and Play" hardware devices. The Plug and Play standard was developed in a joint effort between Compaq Corporation, Intel Corporation, Microsoft Corporation and Phoenix Technologies Ltd. The Plug and Play standard is described for example in the "Plug and Play ISA specification" which is publicly available on the internet sites of Microsoft and Intel Corporation. This standard is also described in a publication entitled "Hardware design guide for Windows 95", Microsoft Press, ISBN 1-55615-642-1.

The Plug and Play specification allows for the automatic configuration of Plug and Play expansion cards. Any conflict that may exist between different Plug and Play cards is automatically resolved by the system.

The two key functions performed by the Plug and Play system binary input output system (BIOS) are resource management and runtime configuration. The basic system resources, which include the direct memory access (DMA) channels, interrupt request lines, and I-O and memory addresses, are allocated by the Plug and Play system BIOS in its resource management mode. Because there are thousands of expansion cards available, these system resources are commonly allocated in a conflicting manner in ISA systems, which can lead to boot strap and system configuration failures. In its role as resource manager, the Plug and Play system BIOS configures the Plug and Play expansion cards before or during the power on self-test (POST) procedure.

During the Plug and Play configuration phase, the Plug and Play expansion cards provide their resource requirements to allow the system BIOS to perform resource allocation and conflict resolution. After the configuration procedure is complete, POST is executed. After the POST procedure is completed, control is transferred from the system BIOS to the operating system software. However, in its run time configuration mode, the system BIOS does provide configuration services for system board devices after the POST procedure has finished. This feature allows the system BIOS to dynamically change the resources allocated to system board devices after the operating system has been loaded and thereby allows the operating system software to manipulate the configuration of the system board devices.

During the Plug and Play configuration phase the system BIOS performs resource data read cycles on the isolated expansion card which is to be integrated in the host computer system. Resource data describes all the resource requirements of the Plug and Play ISA expansion card. The resource data includes such items as the Plug and Play version number, the number of logical devices (i.e., the number of functions available on the Plug and Play expansion card), the logical device ID, compatible device ID, DMA format, I-O port descriptor, fixed location I-O port descriptor, memory range descriptor, identifiers string and various other information.

The resource data along with the serial identifier of the expansion card are conventionally stored in a serial EEPROM. Typically the expansion card resource data is initially read into a resource data register on the expansion card. After 8 bits have been loaded into the resource data register, a status flag on the expansion card is set indicating that the next bite of resource data is ready to be outputted from the EEPROM. Thus, the system BIOS will read the resource data one bite at a time from the resource data register. This process is repeated until all the resource data has been read. For a more comprehensive description of the Plug and Play configuration phase, reference is made to U.S. Pat. No. 5,517,646.

A Plug and Play device which is using a serial EEPROM for resource data storage has to access that serial EEPROM according to the EEPROM's serial access protocol. Unfortunately, there are at least three different types of protocols which are commonly used by different types of serial EEPROM's.

Therefore a need exists for a more flexible hardware design of Plug and Play cards and controllers as well as for an improved method for reading of resource information from a Plug and Play hardware device as well as for a method for determining a type of a serial EEPROM.

These problems and others are substantially solved by applying the features laid down in the independent claims. Preferred embodiments are set out in the dependent claims.

The invention is advantageous in that it allows a more flexible hardware design of Plug and Play devices at lower cost. According to the invention the Plug and Play hardware can operate with different types of EEPROMs without a need to redesign the hardware for a particular type of EEPROM.

Also, it is not necessary to add a dedicated pin to the EEPROM to signal the type of EEPROM whi ch i s crucia l as regards the price of the EEPROM. On the contrary, standard EEPROM's can be used without any need of modification.

The invention is of use in all environments which require EEPROMs of different access protocols. The invention is particularly advantageous in a Plug and Play environment, especially in a Plug and Play environment according to the Plug and Play ISA specification. This allows the design of add-in personal computer cards which are reliably integrated into the host computer system according to the Plug and Play standard irrespective of the type of access protocol of the EEPROM used for the card. This is a substantial technical advantage in particular for inexperienced computer users since this saves th e user from having to manipulate the BIOS of the personal computer by hand in case of a mismatch of the assumed access protocol to the EEPROM and the actual type of EEPROM used in the card.

BRIEF DESCRIPTION OF THE DRAWING

FIG. 5 schematically shows the address space of two different types of EEPROM's;

FIG. 6 shows the overall Plug and Play sequence; and

FIG. 7 shows the sequence for determining the type of EEPROM in greater detail.

DETAILED DESCRIPTION OF A PREFERRED EMBODIMENT

In general a serial EEPROM requires 4 different signals to be externally accessed. A serial EEPROM requires an enable signal to select the EEPROM as well as a clock signal. Further a data-in signal is required in order to send an op-code and an address to the EEPROM. For output data from the EEPROM a further signal is required which is data-out. For purposes of the following description the chip select signal will be denoted E2EN, the clock signal SCPCLK, the data-in signal SCPTXD and the data-out signal SCPRXD.

Figure 1:
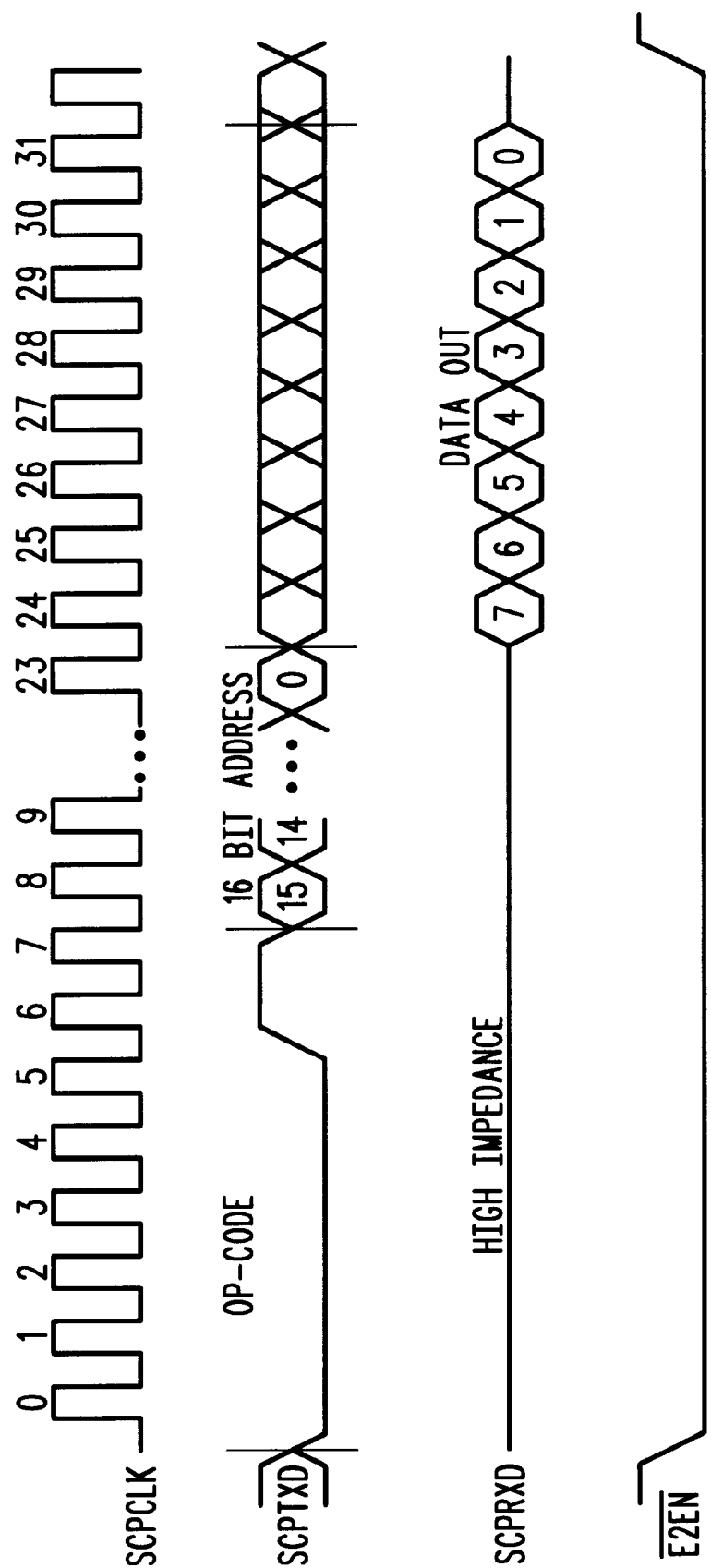
FIG. 1 is a signal diagram of the read protocol of a 16 bit address serial EEPROM.

With reference to FIG. 1 now the read protocol of a first type of EEPROM is described in the following in greater detail. First the enable signal $\overline{\text{E2EN}}$ has to change from logical 1 to logical 0 to initiate a read operation. Thereby the EEPROM is selected. Further, clock pulses SCPCLK have to be applied to the EEPROM. In the example shown in FIG. 1 the clock pulses of the signal SCPCLK are numbered whereby the first clock pulse after the enable signal E2EN changed from logical 1 to logical 0 is denoted as 0.

Concurrently with the SCPCLK clock pulse number 0 a read op-code is transmitted to the EEPROM via the signal SCPTXD. For this first type of EEPROM considered here the read op-code is of length 1 byte. Since the op-code is inputted serially this operation covers the clock pulses of the signal SCPCLK from 0–7. After the op-code the 16 address bits are transmitted to the EEPROM via the signal SCPTXD starting with the most significant bit position 15 and ending with the least significant bit position 0. Since again this operation is carried out serially the clock pulses 8–23 of the clock signal SCPCLK are covered.

After the read op-code and address have been transmitted, the data stored in the memory of the EEPROM at the selected address is shifted out. The data word stored in the EEPROM at the selected address is outputted sequentially via the signal SCPRXD right after the last address bit has been transmitted. Since a data word has a length of 1 byte this output operation covers the clock pulses 24–31 of the SCPCLK clock. Hence in the example of a first type of EEPROM shown in FIG. 1 a number of X=24 clock pulses of the SCPCLK clock are required to initiate the following output operation of the data bits 7–0. The EEPROM X25080 as well as the EEPROM X25128 which are commercially available from Xicor, Inc. are examples for EEPROM's of this type.

With respect to FIG. 2 an example of a second type of serial EEPROM is given in the following. As for the first type of EEPROM the second type of EEPROM considered here is also selected by putting the enable signal $\overline{\text{E2EN}}$ low. During the first 8 clock pulses 0–7 of the clock signal SCPCLK the serial read op-code is transmitted to the EEPROM. Bit 4 of the read op-code contains address bit A8 which is the most significant address bit of the selected address. The following address bits A7–A0 are transmitted to the EEPROM during the consecutive clock pulses 8 to 15 of the SCPCLK. After the last address bit A0 has been transmitted to the EEPROM the data stored in the memory array at the selected address is shifted out on the SCPRXD signal output starting with the most significant data bit 7 during clock pulse number 16.

The data stored in memory at the next address can be read sequentially by continuing to provide clock pulses. The address is automatically incremented to the next higher address after each byte of data is shifted out. This operational mode in which data words stored on consecutive addresses is shifted out sequentially simply by continuing to provide clock pulses is called "continuous read mode". Examples for EEPROM's of these types are the EEPROM's ST95080 and ST95020 which are commercially available from SGS-THOMSON MICRO ELECTRONICS.

It is important to note that for the example of a second type of EEPROM considered here a number of X=23 clock pulses of the SCPCLK clock is required in order to initiate and complete the output of a 1 byte data word of a selected address. If the signal SCPCLK is continued to be applied to the EEPROM the address is automatically incremented and the corresponding consecutive data word is shifted out from clock pulse 24 of the SCPCLK signal onwards.

With respect to FIG. 3 now an example of a third type of serial EEPROM is briefly described in the following. For this type of EEPROM the three bit read op-code (110 BIN) proceeds the address bits on the signal SCPTXD. Data is shifted out via the signal SCPRXD like for the examples considered above. The type of EEPROM shown in FIG. 3 will also automatically increment the address and will clock out the next byte as long as the enable input signal $\overline{\text{E2EN}}$ is held high and clock pulses are continued to be applied (continuous read mode). One example of such a third type of serial EEPROM is the EEPROM 93C46 in x8 organization which is commercially available from SGS-THOMSON MICRO ELECTRONICS.

Figure 2:
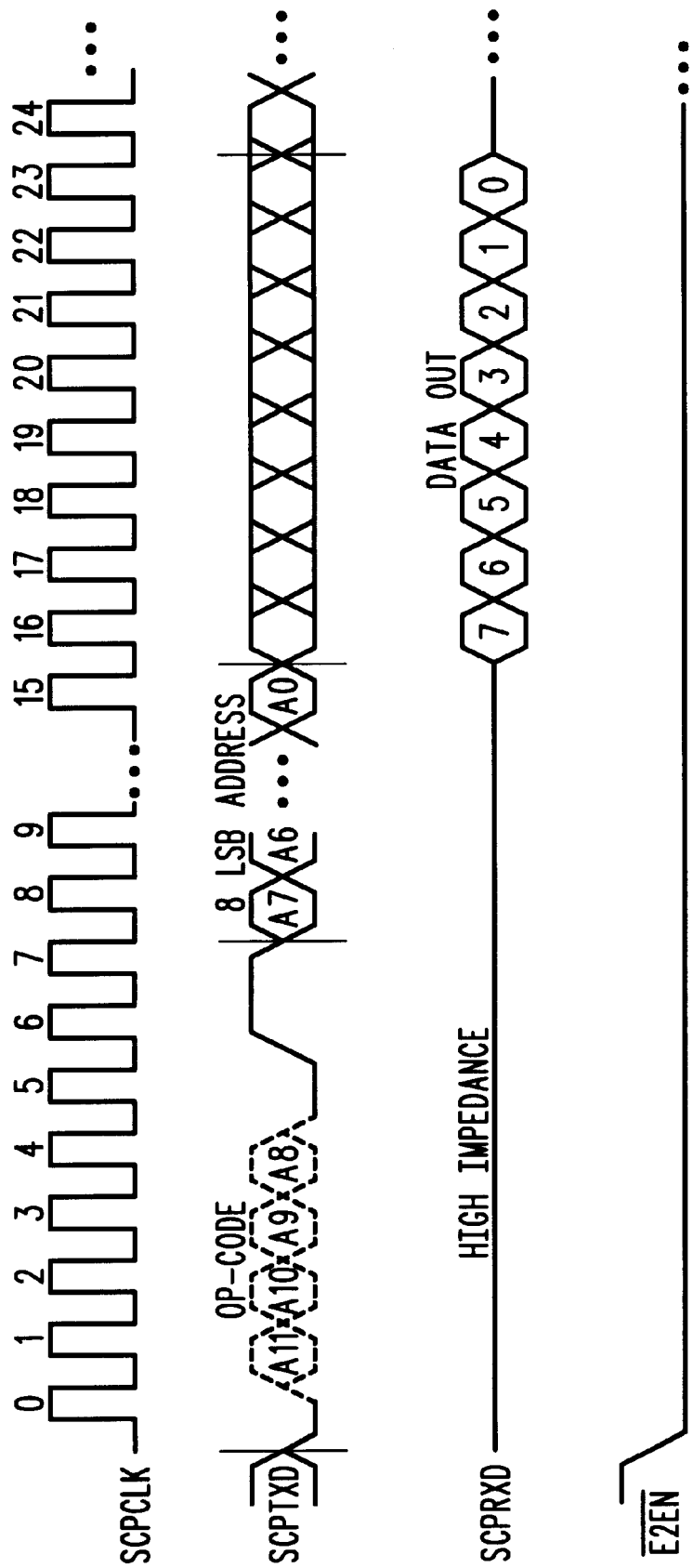
FIG. 2 is a signal diagram of the read protocol of a 8 bit address serial EEPROM.
Figure 3:
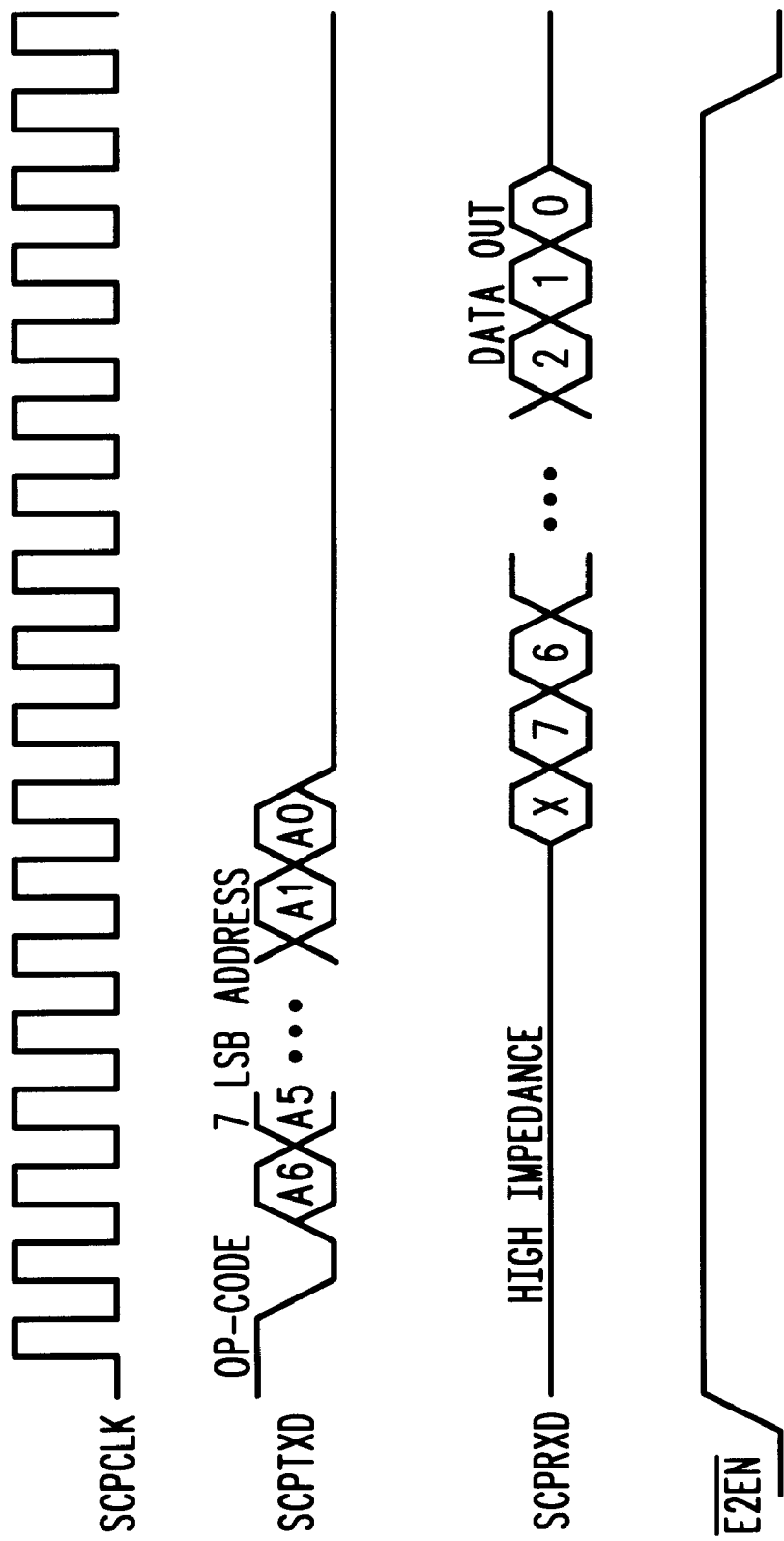
FIG. 3 i s a signal diagram of the read protocol of a mixed address serial EEPROM.

It is important to note that the enable signal input $\overline{\text{E2EN}}$ of the third type of EEPROM considered with respect to FIG. 3 is of opposite polarity as compared to the first and second type of FIGS. 1 and 2, respectively. As a consequence the third type of EEPROM is not compatible to the enable signals applied to the first and second types. As long as the enable signal $\overline{\text{E2EN}}$ is held low in the case of the example of a third type of EEPROM considered with respect to FIG. 3, the EEPROM returns a 3-state code which is "ff" (HEX), when a read operation is attempted. Other examples for such a third type of EEPROM have a floating data output during the high impedance state.

Figure 4:
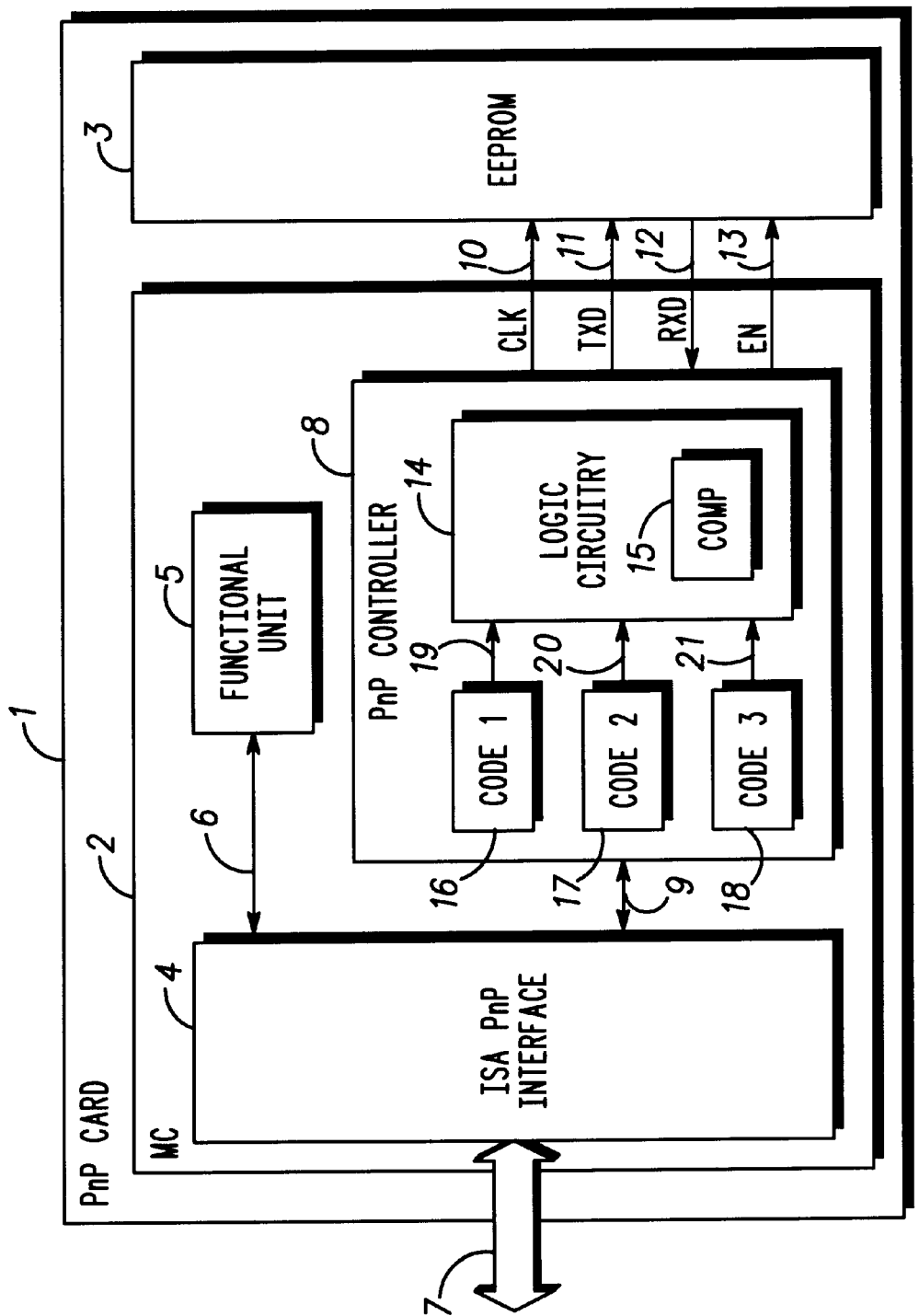
FIG. 4 shows a block diagram of a Plug and Play card according to the inven tion.

With respect to FIG. 4 now one embodiment of the invention is explained in greater detail. FIG. 4 shows a schematic block diagram of an example of an electronic device according to the invention which in this case is a Plug and Play card 1. The Plug and Play card 1 comprises micro controller 2 and EEPROM 3.

The micro controller 2 incorporates a standard ISA Plug and Play interface 4. Further, the micro controller 2 comprises a functional unit 5 which carries out a certain type of functionality or task. For example the functional unit 5 can be an ISDN interface to effect high speed data transmissions via ISDN telephone lines from and to the host computer of the Plug and Play card 1. The host computer is not shown in the drawing but can be any type of computer, especially a personal computer (PC).

Functional unit 5 can also provide for the functionality of a modem or interface to any kind of external device such as a scanner or a video display. The functional unit 5 is coupled to the interface 4 via internal bus 6 whereas the interface 4 is coupled to the host computer via the external bus 7. Thereby an interchange of information between the functional unit 5 and the host computer is made possible.

The Plug and Play card 1 has a Plug and Play controller 8 to carry out the Plug and Play configuration and initialization sequence. The Plug and Play controller 8 is coupled to the interface 4 via signal lines 9 and to the EEPROM 3 via signal lines 10, 11, 12 and 13. The Plug and Play controller 8 has logic circuitry 14 which comprises a comparator 15 as well as registers 16, 17 and 18 which are coupled to the logic circuitry 14 via the signal lines 19, 20 and 21, respectively.

The control required to carry out the Plug and Play sequence is provided by the logic circuitry 14. The signal lines 10, 11, 12 and 13 provide an interface between the Plug and Play controller 8 and the EEPROM 3 in which resource information of the Plug and Play card 1 is stored. Signal line 10 carries a clock signal like the signal SCPCLK considered with respect to FIGS. 1–3, the signal line 11 carries a data-in signal to transmit op-codes and addresses to the EEPROM 3—like the signal SCPTXD, the signal line 12 carries the data in signal to transmit outputted data from the EEPROM 3 to the controller 8—like the signal SCPRXD, and the signal line 13 carries the enable signal for EEPROM 3—like the signal $\overline{E2EN}$.

The Plug and Play controller 8 can deal with 3 different types of read protocols to access the EEPROM 3. For each type of protocol a dedicated code is stored in one of the registers 16, 17 and 18, respectively. The code 1 belongs to the first type of protocol, code 2 to the second and the code 3 to the third type of protocol.

With respect to FIG. 5 it is explained how the code data which is indicative of the type of EEPROM is stored in the EEPROM. If the EEPROM 3 is of the first type (cf. FIG. 1) the code 1 is stored on a predetermined address within EEPROM 3. In principle, the predetermined address is arbitrary; for simplicity in this case the predetermined address is 0.

If the EEPROM 3 is of the second type (cf. FIG. 2) the code 2 is stored on an address which is consecutive with respect to the predetermined address. Hence, in the example considered here the code 2 is stored on the address 1 within the EEPROM 3 since the code 1 is stored on the address 0.

If the EEPROM 3 is of the third type (cf. FIG. 3) the code 3 need not to be stored within the memory array of the EEPROM. Code 3 is defined to equal the return code of the EEPROM in case of a three state or high impedance condition.

When the Plug and Play controller 8 needs to read the resource data which is stored in the EEPROM 3 during the Plug and Play procedure first the type of the EEPROM 3 has to be determined for a proper read operation. Initially the Plug and Play controller 8 applies the first read protocol (cf. FIG. 1) by issuing the appropriate signals on the lines 10, 11 and 13, respectively. The corresponding signal diagrams are shown in FIG. 1 for the example considered there.

The Plug and Play controller 8 has a priori information about the first predetermined address which in this case is 0. Hence, the Plug and Play controller 8 issues the appropriate signals via the signal lines 10, 11 and 13 for a read operation of the data word stored on address 0 of the EEPROM 3.

If the EEPROM 3 is in fact of the first type a number of X clock pulses (e.g. X=24) are necessary to initiate the output operation. After the last clock pulse of the initiation phase the output data are shifted out via the signal line 12. If in fact the EEPROM 3 is of the first type the code 1 is transmitted from the EPROM 3 to the Plug and Play controller 8 via signal line 12 during the clock pulses following the X clock pulses of the initiation phase. The state of the signal line 12 is ignored by the controller 8 during the X clock pulses of the initiation phase.

If the EEPROM 3 is of the second type, a number of X clock pulses is sufficient for a complete output operation including the initialization phase and the shifting out of the corresponding data word (cf. FIG. 2). As a consequence the data word which is stored on the address 0 of the EEPROM 3 is already shifted out during the first X clock pulses if the Plug and Play controller 8 issues the appropriate control signals via signal lines 10, 11 and 13 to the EEPROM 3 to initiate a read operation of the address 0 as if a type 1 EEPROM where present.

However, the data word stored on address 0 of the EEPROM 3 is ignored in this case since only output data shifted out after the last of the X clock pulses are inputted into the Plug and Play controller 8. According to the first read protocol which is applied to access the EEPROM 3 there are further clock pulses after the X clock pulses of the initiation phase. In case of EEPROM 3 being of type 2 this means that after the output operation of the data word stored on the address 0 the address is automatically incremented and the data word stored on address 1 is shifted out via signal line 12 to the Plug and Play controller 8.

The data word stored on the address 1 of the EEPROM 3 in this case is the code 2 which identifies the second type. The data stored on the address 0—if any—is "don't care" data since it is outputted during the first X clock pulses and therefore ignored by the Plug and Play controller 8 according to the first read protocol which is employed.

If the EEPROM 3 is of the third type, still the first read protocol is applied initially by the controller 8 since it does not have a priori information about the type of the EEPROM 3. In this case the read operation which is initiated by the Plug and Play controller 8 via the signal lines 10, 11 and 13 must fail since the enable signal input of the EEPROM 3 is of opposite polarity as compared to EEPROM's of type 1 or 2. Since the EEPROM 3 is not enabled during the attempted read operation of the Plug and Play controller 8 its data output remains in the three state condition which is indicated by the return code ff (hexadecimal) and which is transmitted via the signal line 12 to the Plug and Play controller 8 and inputted into the controller 8 after the X clock pulses. The return code of the EEPROM 3 which indicates the three state condition of the output of the EEPROM 3 equals the code 3.

Returning now to FIG. 4 the data word received from the EEPROM 3 by the Plug and Play controller 8 is compared by comparator 15 under the control of the logic circuitry 14 with the codes stored in the registers 16, 17 and 18. If the data which is read from the EEPROM 3 matches the code 1 this signals to the logic circuitry 14 that the EEPROM 3 is of the first type. Likewise, if the input data word matches the code 2 or the code 3, this signals that the EEPROM 3 is of the second or third type, respectively. Based on the match found by comparator 15 the appropriate read protocol is selected in order to read resource data from the EEPROM 3 in the following in order to complete the Plug and Play procedure.

In an alternative preferred embodiment there is no such register 18 but only the registers 16 and 17. If the received data word from the EEPROM does not match the code 1 or the code 2 this signals to the logic circuitry that the EEPROM is of the third type. This also works if a third type of EEPROM is used which has a floating data output in case of a three state condition: The likelihood that the floating data by chance equals one of the codes is very low so that in practice it can be assumed that none of the codes matches the received floating data which also signals to the logic circuitry that the EEPROM 3 is of the third type.

With respect to FIG. 6 now one embodiment of the method of the invention is explained. The method of the invention is used within a Plug and Play sequence 60 for example according to the corresponding ISA standard. Within the Plug and Play sequence 60 it is required to read resource data from the EEPROM. This is done in step 61. Within step 61 it is necessary in step 62 to determine the type of the EEPROM in order to guarantee a proper read operation by selecting the appropriate read protocol.

After the type of the EEPROM has been determined and the appropriate protocol has been selected the EEPROM is accessed according to the selected protocol in step 66 to read resource data which are required to continue the Plug and Play sequence 60. Within the Plug and Play sequence 60 further access operations to the EEPROM can occur according to the same selected read protocol to access different kinds of resource information in the required order as determined by the requirements defined by the Plug and Play sequence.

With respect to FIG. 7 the step 62 in which the type of EEPROM is determined is explained in greater detail. In step 63 a first read protocol is applied to the EEPROM. The first read protocol has a length of X clock pulses to initiate the consecutive shifting out of data from an EEPROM of the first type (cf. FIG. 1).

The data word which is shifted out at the output of the EEPROM after the first X clock pulses is read in step 64 and decoded in step 65. If the EEPROM is in fact of the first type, a code 1 is read which is indicative of this first type whereas if the EEPROM is of the second type, a code 2 is read which is indicative of the second type. This is because in the second type EEPROM the read address issued in step 63 is incremented automatically according to the continuous read mode so that the data word stored on the consecutive address is outputted (cf. FIG. 5).

The received data word from the EEPROM is evaluated in step 65. If either code 1 or code 2 are received this indicates that the EEPROM is of type 1 or type 2, respectively. If the data received from the EEPROM after first X clock pulses does not match code 1 or code 2 this means that the EEPROM is of the third type.

After the type of the EEPROM has been determined in step 65 based on the decoding of the output data received from the EEPROM after the X clock pulses, control goes to step 66 in which the right protocol is applied to the EEPROM to read the required resource data.

We claim:

1. A method for determining a type of a serial programmable read only memory means, whereby said memory means is either of a first or a second type, said first type having a first read protocol requiring a number of X clock pulses to initiate an output operation, said second type having a second read protocol requiring a number of X clock pulses to initiate and complete an output operation, said second type supporting a continuous read mode, said first type having first data programmed on a first predetermined address, said first data being indicative of said first type, said second type having second data programmed on a second predetermined address, said second data being indicative of said second type, said second predetermined address being consecutive with respect to said first predetermined address, said method comprising the steps of:

a) applying said first read protocol with said first predetermined address to said memory means; and b) reading of output data from said memory means after the last of said X clock pulses, said output data being first or second data depending on whether said memory means is of said first or second type.

2. The method according to claim 1 said memory means being of said first or second type or of a third type, said first type having a first enable signal input and said second type having a second enable signal input, said first and second enable signal inputs being compatible, said third type having a third enable signal input which is not compatible to said first and second enable signal inputs, said method further comprising the steps of:

c) in case that said reading of output data failed in said step (b), concluding that said memory means is of said third type.

3. A method for reading of resource information from a plug and play hardware device, said hardware device having a serial programmable read only memory means for storing of said resource information, whereby said memory means is either of a first or a second type, said first type having a first read protocol requiring a number of X clock pulses to initiate an output operation, said second type having a second read protocol requiring a number of X clock pulses or fewer to initiate and complete an output operation, one of said second type or first type supporting a continuous read mode, said first type having first data programmed on a first predetermined address, said first data being indicative of said first type, said second type having second data programmed on a second predetermined address, said second data being indicative of said second type, said second predetermined address being consecutive with respect to said first predetermined address, said method comprising the steps of:

a) applying said first read protocol with said first predetermined address to said memory means;

b) reading of output data from said memory means after the last of said X clock pulses, said output data being first or second data depending on whether said memory means is of said first or second type;

c) if a value was successfully read via step (b), selecting said first read protocol if said output data is said first data and selecting said second read protocol if said output data is said second data; and d) reading said resource information from said memory means by utilizing said selected read protocol.

4. The method according to claim 3 said memory means being of said first or second type or of a third type, said first type having a first enable signal input and said second type having a second enable signal input, said first and second enable signal inputs being compatible, said third type having a third enable signal input which is not compatible to said first and second enable signal inputs, said method further comprising the steps of:

e) in case that said reading of output data failed in said step (b) concluding that said memory means is of said third type; and f) selecting said third read protocol.

5. A plug and play controller for reading of resource information from a serial programmable read only memory means for storing of said resource information, whereby said memory means is either of a first or a second type, said first type having a first read protocol requiring a number of X clock pulses to initiate an output operation, said second type having a second read protocol requiring a number of X clock pulses to initiate and complete an output operation, said second type supporting a continuous read mode, said first type having first data programmed on a first predetermined address, said first data being indicative of said first type, said second type having second data programmed on a second predetermined address, said second data being indicative of said second type, said second predetermined address being consecutive with respect to said first predetermined address, said controller comprising:

means for applying said first read protocol with said first predetermined address to said memory means;

means for reading of output data from said memory means after the last of said X clock pulses, said output data being first or second data depending on whether said memory means is of said first or second type;

means for selecting said first read protocol if said output data is said first data and selecting said second read protocol if said output data is said second data; and means for reading said resource information from said memory means by applying said selected read protocol.

6. An electronic device comprising a plug and play controller for reading of resource information from a serial programmable read only memory means for storing of said resource information, whereby said memory means is either of a first or a second type, said first type having a first read protocol requiring a number of X clock pulses to initiate an output operation, said second type having a second read protocol requiring a number of X clock pulses to initiate and complete an output operation, said second type supporting a continuous read mode, said first type having first data programmed on a first predetermined address, said first data being indicative of said first type, said second type having second data programmed on a second predetermined address, said second data being indicative of said second type, said second predetermined address being consecutive with respect to said first predetermined address, said controller comprising:

means for applying said first read protocol with said first predetermined address to said memory means;

means for reading of output data from said memory means after the last of said X clock pulses, said output data being first or second data depending on whether said memory means is of said first or second type;

means for selecting said first read protocol if said output data is said first data and selecting said second read protocol if said output data is said second data;

means for reading said resource information from said memory means by applying said selected read protocol.

7. The electronic device according to claim 6 said memory means being of said first or second type or of a third type, said first type having a first enable signal input and said second type having a second enable signal input, said first and second enable signal inputs being compatible, said third type having a third enable signal input which is not compatible to said first and second enable signal inputs, said means for selecting being adapted to select said third read protocol in case that said means for reading of output data failed to read output data after said X clock pulses.

8. A method for determining a read protocol used by a memory device located within an electrical system, the method comprising the steps of:

(a) providing the memory device within the electrical system, the memory device using a read protocol that is either a first read protocol, a second read protocol, or a third read protocol;

(b) using a controller to perform a read access to the memory device using an initial read protocol;

(c) using information obtained from the access in step (b) to determine an actual read protocol used by the memory device, the actual read protocol being one of either the first read protocol, the second read protocol, or the third read protocol; and (d) accessing, with the controller, subsequent information from the memory device using the actual read protocol.

9. The method of claim 8 wherein the memory device is an EEPROM device that has: (1) a serial input access terminal so that the controller provides serial opcode and address information to the memory device; (2) a serial output access terminal so that the controller provides serial data information to the controller; (3) an enable terminal that selectively enables the memory device for functional use; and (4) a clock terminal for receiving a clock signal.

10. The method of claim 8 wherein the first read protocol is a protocol wherein an M bit opcode is provided to the memory device in M clock pulses, followed by an N bit address signal that is provided to the memory device in N clock pulses where both N and M are finite positive integer values.

11. The method of claim 10 wherein the initial read protocol is the first read protocol.

12. The method of claim 8 wherein the second read protocol is a protocol wherein a M bit opcode is provided to the memory device in M clock pulses, followed by an N bit address signal that is provided to the memory device in N clock pulses where both N and M are finite positive integer values and the opcode contains one or more address bits.

13. The method of claim 12 wherein the second read protocol will continuously read sequential data values from memory while clock signals continue to be provided to the memory device after receipt of an initial address.

14. The method of claim 8 wherein the first and second read protocols use a memory device enable signal that is active in a first binary state while the third protocol uses a memory device enable signal that is active in a second binary state that is opposite the first binary state.

15. The method of claim 8 wherein a detection of a failure of the read access in step (b) identifies one of either the first, second, or third read protocols as the actual read protocol.

16. The method of claim 8 wherein a data value read from the memory in step (d) is compared to one or more register values to determine which one of the first, second, or third read protocols is used by the memory device as the actual read protocol.

17. An apparatus for determining a read protocol used by a memory device, the apparatus comprising:

the nonvolatile memory device storing a protocol identification value which identifies a read protocol used by the nonvolatile memory device;

a controller coupled to the nonvolatile memory device through at least a clock line, a serial input line, a serial output line, and an enable line, the controller containing at least two registers which store protocol identification codes where the registers are coupled to a compactor for comparing the protocol identification codes to the protocol identification value from the nonvolatile memory device so that the controller can identify the read protocol used by the nonvolatile memory device;

an external bus interface unit coupled to the controller for communicating information from the controller to bus terminals; and a functional unit coupled to the external bus interface unit.

18. The apparatus of claim 17 wherein the at least two registers is three registers that each contain a unique protocol identification code.

19. An apparatus for determining a read protocol used by a memory device, the apparatus comprising:

the nonvolatile memory device having an enable signal input;

a controller coupled to the nonvolatile memory device through at least a clock line, a serial input line, a serial output line, and an enable line coupled to the enable signal input of the nonvolatile memory device, the controller circuitry being coupled to detect when a protocol detection access between the controller and the nonvolatile memory device succeeds in reading a value from the nonvolatile memory device or fails in reading a value from the nonvolatile memory device during protocol detection operations, such success or failure providing protocol information about the nonvolatile memory device to the controller;

an external bus interface unit coupled to the controller for communicating information from the controller to bus terminals; and a functional unit coupled to the external bus interface unit.

20. The apparatus of claim 19 wherein the nonvolatile memory device stores a protocol identification value which identifies a read protocol used by the nonvolatile memory device and the controller contains a compactor coupled to protocol identification registers, whereby if the controller succeeds in reading a value from the nonvolatile memory device, the compactor is used along with the protocol identification value to determine a protocol used by the nonvolatile memory device.

* * * * *